(12) United States Patent
Choi et al.

(10) Patent No.: US 11,370,169 B2
(45) Date of Patent: Jun. 28, 2022

(54) APPARATUS FOR PREVENTING PHOTOCURING OF BIOMATERIAL IN DISCHARGE NOZZLE AND DISPENSER AND BIO 3D PRINTER INCLUDING THE SAME

(71) Applicant: CLECELL Co., Ltd., Seongnam-si (KR)

(72) Inventors: Jong Eon Choi, Seoul (KR); Kyoung Whee Jeon, Seoul (KR)

(73) Assignee: CLECELL CO., LTD., Seongnam-si (KR)

( * ) Notice: Subject to any disclaimer, the term of this patent is extended or adjusted under 35 U.S.C. 154(b) by 156 days.

(21) Appl. No.: 16/778,997

(22) Filed: Jan. 31, 2020

(65) Prior Publication Data

US 2021/0031450 A1 Feb. 4, 2021

Related U.S. Application Data

(63) Continuation of application No. PCT/KR2020/000523, filed on Jan. 10, 2020.

(30) Foreign Application Priority Data

Aug. 1, 2019 (JP) .............................. JP2019-142258

(51) Int. Cl.
*B29C 64/209* (2017.01)
*B29C 64/227* (2017.01)
(Continued)

(52) U.S. Cl.
CPC .......... *B29C 64/277* (2017.08); *B29C 64/209* (2017.08); *B29C 64/227* (2017.08);
(Continued)

(58) Field of Classification Search
CPC ... B29C 64/277; B29C 64/321; B29C 64/209; B29C 64/393; B29C 64/227;
(Continued)

(56) References Cited

U.S. PATENT DOCUMENTS 7,819,728 B2 * 10/2010 Beckley ................. B60N 3/106
454/155
7,914,491 B2 * 3/2011 Rockrohr ........... A61B 17/3462
604/164.01

(Continued)

FOREIGN PATENT DOCUMENTS

WO 2017149525 A1 9/2017
WO 2018053565 A1 3/2018

OTHER PUBLICATIONS

English Translation of TWM300172U (Year: 2006).*

*Primary Examiner* — Joseph S Del Sole
*Assistant Examiner* — Baileigh Kate Darnell
(74) *Attorney, Agent, or Firm* — Hauptman Ham, LLP (57) ABSTRACT

An apparatus for preventing photocuring of biomaterial in a discharge nozzle and in a dispenser of a bio 3D printer includes a driving unit for providing a driving force, a shutter member that receives the driving force from the driving unit and to move between a first position not covering the discharge nozzle and a second position covering at least the discharge nozzle in a reciprocating manner, and a control unit for controlling the discharge nozzle. The driving unit, the shutter member, the discharge nozzle, and the plurality of light sources constitute a head unit in an integrated manner. The head unit includes an end plane. The shutter member and a distal end of the discharge nozzle are positioned near a center of the end plane. The plurality of light sources are positioned on the end plane with the shutter member and the discharge nozzle therebetween.

9 Claims, 6 Drawing Sheets

(51) Int. Cl.
*B29C 64/277* (2017.01)
*B29C 64/321* (2017.01)
*B33Y 30/00* (2015.01)
*B29C 64/393* (2017.01)
*B33Y 10/00* (2015.01)

(52) U.S. Cl.
CPC .......... *B29C 64/321* (2017.08); *B29C 64/393* (2017.08); *B33Y 10/00* (2014.12); *B33Y 30/00* (2014.12)

(58) Field of Classification Search
CPC ..... B29C 64/106; B29C 64/30; B29C 64/124; B33Y 10/00; B33Y 30/00; B33Y 40/00; B05B 15/50
See application file for complete search history.

(56) References Cited

U.S. PATENT DOCUMENTS

| | | | |
|---|---|---|---|
| 2009/0263849 A1* | 10/2009 | Sun | B01L 3/502707 435/29 |
| 2011/0212501 A1 | 9/2011 | Yoo | |
| 2015/0197063 A1* | 7/2015 | Shinar | G06F 30/00 700/98 |
| 2018/0065320 A1* | 3/2018 | Tyler | B29C 48/05 |
| 2019/0047309 A1* | 2/2019 | Weiss | B05B 15/50 |

* cited by examiner

APPARATUS FOR PREVENTING PHOTOCURING OF BIOMATERIAL IN DISCHARGE NOZZLE AND DISPENSER AND BIO 3D PRINTER INCLUDING THE SAME

CROSS-REFERENCE TO RELATED APPLICATIONS

This application is a continuation of International Application No. PCT/KR2020/000523, filed Jan. 10, 2020, which is based upon and claims the benefit of priority from Japanese Patent Application No. 2019-142258, filed on Aug. 1, 2019, the contents of which are incorporated herein by reference in their entirety.

BACKGROUND

1. Field

The present invention relates to an apparatus for preventing photocuring of biomaterial in a discharge nozzle and a dispenser and a bio 3D printer including the same.

2. Description of the Related Art

A 3D printer has experienced constant developments including the development of a fused deposition modeling (FDM) type by the Stratasys in 2002, since a stereo lithography apparatus (SLA) type 3D printer had been released by the 3D Systems in 1984.

Recently, a study on a bio 3D printer employing biomaterial has been actively performed with an increase of the demands in the medical field.

For example, US Pat. Pub. No. 2011/0212501 describes a method of coating a surface of a petri dish as a substrate with a cross-linking material, printing hydrogel and forming a gel layer, printing cells on the hydrogel layer, and cross-linking the cell-containing gel layer via a surface coating.

A bio 3D printer includes a dispenser including a discharge nozzle for discharging biomaterial, a stage for fixing a container (substrate) on which the discharged biomaterial is layered, and a frame for moving the stage or the dispenser in x, y, and z directions.

Steps of outputting a bio object using a 3D printer with the biomaterial include fabricating the biomaterial by mixing hydrogel and cells, slicing an STL file created with a 3D CAD model, and discharging the biomaterial from a discharge nozzle for each slice.

When the biomaterial is in a photocuring fluid state, the biomaterial is cured with an emission of ultraviolet (UV) light after being discharged, to avoid a collapse of the biomaterial after being layered.

However, if the UV light is active near the discharge nozzle, not only the discharged biomaterial but also the residual biomaterial near the discharge nozzle or the biomaterial contained in a syringe may be cured, and as a result, cogging of the discharge nozzle may happen.

SUMMARY

According to some embodiments of the present invention, an apparatus for preventing photocuring of biomaterial in a discharge nozzle and in a dispenser of a bio 3D printer that comprises the dispenser including the discharge nozzle configured to discharge the biomaterial and a plurality of light sources configured to emit light for photocuring the biomaterial when photocuring the biomaterial discharged from the discharge nozzle with the light emitted from the plurality of light sources, includes a driving unit configured to provide a driving force, a shutter member configured to receive the driving force from the driving unit and to move between a first position not covering the discharge nozzle and a second position covering at least the discharge nozzle in a reciprocating manner, and a control unit configured to control the discharge nozzle, the plurality of light sources, and the driving unit. The control unit is configured to control the driving unit in a manner that the shutter member takes the first position or the second position when no light is emitted from the plurality of light sources, to control the driving unit in a manner that the shutter member takes the first position when the biomaterial is discharged from the discharge nozzle, and to control the driving unit in a manner that the shutter member takes the second position when no biomaterial is discharged from the discharge module and the light is emitted from the plurality of light sources. The driving unit, the shutter member, the discharge nozzle, and the plurality of light sources constitute a head unit in an integrated manner. The head unit includes an end plane. The shutter member and a distal end of the discharge nozzle are positioned near a center of the end plane, and the plurality of light sources are positioned on the end plane with the shutter member and the discharge nozzle therebetween.

Further, according to some embodiments of the present invention, a printhead for a bio 3D printer that discharges biomaterial includes the apparatus according to some embodiments of the present invention.

Moreover, according to some embodiments of the present invention, a dispenser module for a bio 3D printer that discharges biomaterial includes the apparatus according to some embodiments of the present invention.

Further, according to some embodiments of the present invention, a bio 3D printer includes the apparatus according to some embodiments of the present invention.

Although the respective embodiments are described herein independently, the respective embodiments can be mutually combined, and the combined embodiments are also included in the scope of the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

It is one object of the present invention to provide an apparatus for preventing photocuring of biomaterial in a discharge nozzle and a dispenser (or syringe) for a bio 3D printer.

It is another object of the present invention to provide a bio 3D printer including an apparatus for preventing photocuring of biomaterial in a discharge nozzle and a dispenser (or syringe).

The technical problems to be solved by the present disclosure are not limited to the above-mentioned, and other technical problems not mentioned herein can be clearly understood by one of ordinary skill in the pertinent art from the following descriptions.

Figure 1:
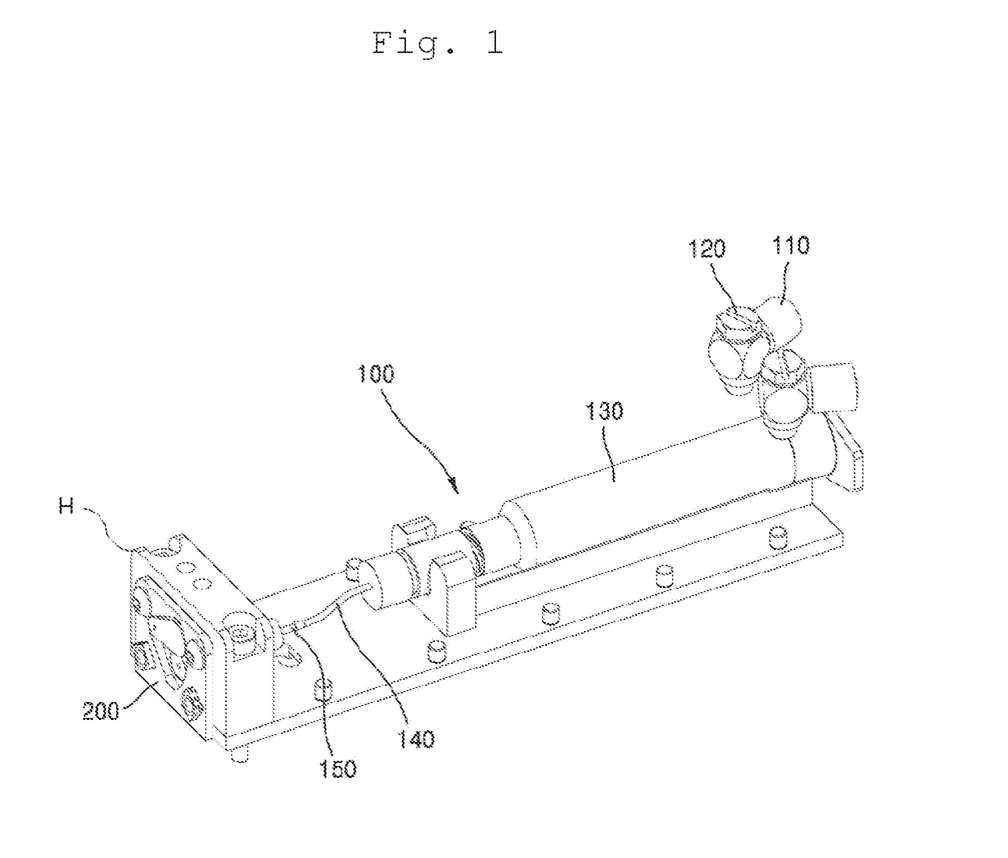
FIG. 1 is a perspective view of a dispenser module of a 3D bio printer according to some embodiments of the present invention.
Figure 2:
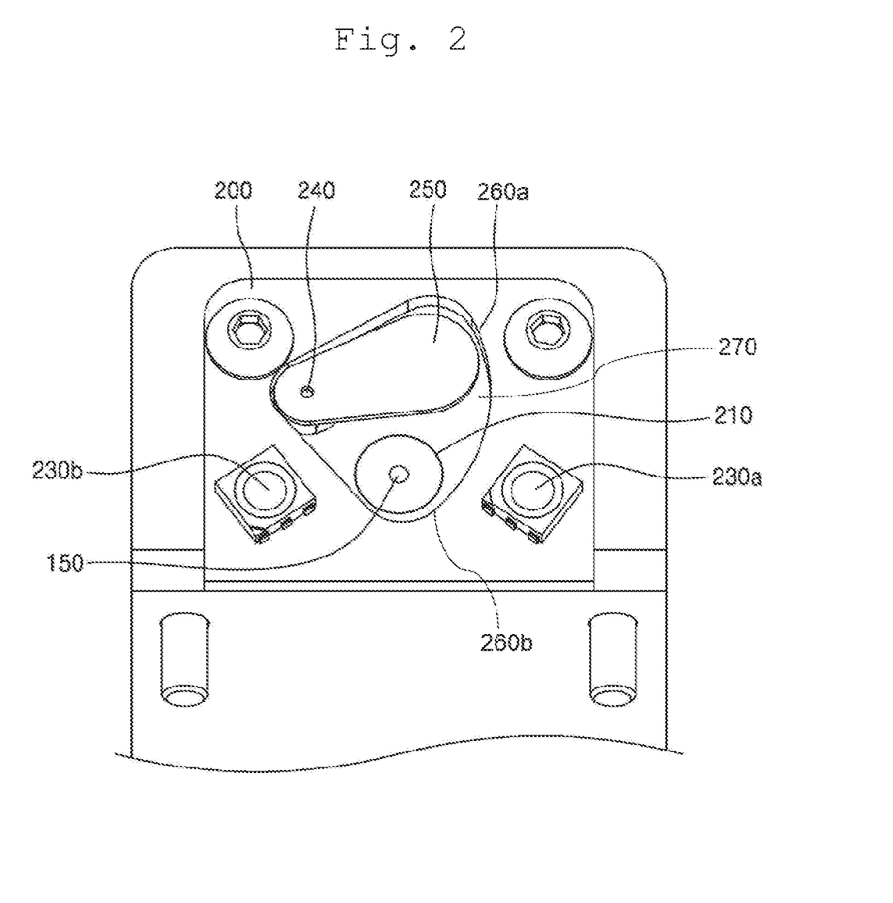
FIG. 2 is a perspective view of a printhead including a shutter member for preventing photocuring of biomaterial in a 3D bio printer according to some embodiments of the present invention.

FIG. 1 is a perspective view of a dispenser module 100 of a 3D bio printer according to some embodiments of the present invention. FIG. 2 is a perspective view of a printhead H including a shutter member 250 for preventing photocuring of biomaterial in a 3D bio printer according to some embodiments of the present invention.

As the temperature of the biomaterial should be maintained at a predetermined level to avoid degeneration of the biomaterial in the dispenser module 100, an apparatus for controlling the temperature, such as a water jacket, is additionally provided. In this specification, the water jacket is omitted from the drawings for convenience sake. However, an inlet/outlet 110 for flowing a refrigerant for the water jacket and a screw 120 for controlling a rate of flow of the refrigerant are shown in FIG. 1.

A syringe 130 provides a space for containing the biomaterial. The syringe 130 has a shape of a syringe configured to maintain a predetermined pressure even when the amount of the biomaterial therein is changed.

A tube 140 is connected to a distal end of the syringe 130, through which the biomaterial contained in the syringe 130 moves to a discharge nozzle 150. The biomaterial has a form of fluid that can be contained in the syringe 130 and is flowable through the tube 140 and the discharge nozzle 150. The biomaterial can have a predetermined viscosity.

The discharge nozzle 150 is coupled to a discharge module 210. When the discharge module 210 receives a predetermined pulse voltage from the outside, the discharge nozzle 150 discharges the biomaterial by a predetermined amount. By controlling intensity and duration of the pulse voltage, the amount of the discharged biomaterial can be controlled. As the biomaterial discharged from the discharge nozzle 150 falls downwards due to the gravity, a direction from the syringe 130 to an end plane 200 is the direction of the gravity in FIG. 1.

As shown in FIG. 2, the discharge module 210 and the discharge nozzle 150 are disposed on the end plane 200.

After the biomaterial is discharged from the discharge nozzle 150, a plurality of light-emitting elements (light sources) 230a and 230b emit light including the ultraviolet toward the discharged biomaterial for photocuring the biomaterial. The light-emitting elements 230a and 230b can be any light-emitting elements that can emit light of a desired wavelength band, such as LED, OLED, and the like.

Although FIG. 2 shows the end plane 200 with two light-emitting elements 230a and 230b, the number of light-emitting elements is not limited to any particular number. The number of light-emitting elements can be determined appropriately depending on spatial disposition, manufacturing cost, uniformity of photocuring the biomaterial, and the like. A circuit for driving the light-emitting elements 230a and 230b can be provided inside the end plane 200.

As shown in FIG. 2, a shutter mechanism according to some embodiments of the present invention includes a shutter driving axis 240 and the shutter member 250. In the example shown in FIG. 2, the shutter driving axis 240 is a rotation shaft of a motor (driving unit) provided in the dispenser module 100 or a rotation shaft coupled to the shaft of the motor, to rotate the shutter member 250. One end of the shutter member 250 is coupled to the shutter driving axis 240 and rotates with the rotation of the shutter driving axis 240. In some embodiments of the present invention, the shutter member 250 is disposed in parallel to the end plane 200.

In the example shown in FIG. 2, the shutter member 250 is formed in a shoehorn shape in plan view, which is expanded in a predetermined angle centering the shutter driving axis 240. The shape of the shutter member 250 is not limited to any particular shape.

As the shutter member 250 should cover (shield) the discharge nozzle 150 or the discharge module 210 when rotated, an area of the shutter member 250 overlapping the discharge module 210 when rotated should be at least as wide as to substantially or completely cover the discharge module 210.

That is, the shape of the shutter member 250 can be any shape as long as an area for covering at least the discharge module 210 is secured such that an open state allows the discharge module 210 to be opened to discharge the biomaterial from the discharge nozzle 150 as intended and a closed state allows the discharge module 210 to be covered from the light emitted from the light-emitting elements 230a and 230b.

A shutter movement limiter (second side wall) 260a is formed by a recessed portion 270 that is recessed from the surface of the end plane 200 by a predetermined depth. The discharge nozzle 150, the discharge module 210, the shutter driving axis 240, and the shutter member 250 are disposed in the recessed portion 270. When the shutter member 250 is rotated with the rotation of the shutter driving axis 240, the shutter movement limiter 260a limits the rotation of the shutter member 250 not to exceed a predetermined range (angle).

When a voltage is applied to the motor and the shutter driving axis 240 rotates, without the shutter movement limiter 260a, the shutter member 250 may rotate exceeding the discharge nozzle 150 and the discharge module 210. As the shutter movement limiter 260a limits the rotation of the shutter member 250 to cover the discharge nozzle 150 and the discharge module 210, the shutter member 250 securely prevent the discharge nozzle 150 and the discharge module 210 from being exposed when photocuring the discharged biomaterial.

The shutter movement limiter 260a can be optional. For example, the rotation position of the shutter member 250 can be controlled using a step motor or using a direct-current (DC) motor and a gear mechanism. In this case, the shutter movement limiter 260a is not necessarily to be prepared.

The shutter member 250 is coupled to the shutter driving axis 240, and as the shutter driving axis 240 rotates, the shutter member 250 moves between a first position not covering the discharge nozzle 150 and the discharge module 210 and a second position covering at least the discharge nozzle 150 and the discharge module 210 in a reciprocating manner.

Although the shutter member 250 that rotates centering around the shutter driving axis 240 is shown in FIG. 2 as the structure for preventing photocuring of the biomaterial in the discharge nozzle and the dispenser of the bio 3D printer, the present invention is not limited to this scheme, but the structure can be implemented in various forms.

According to some embodiments of the present invention, instead of the shutter member 250 that rotates centering around the shutter driving axis 240 shown in FIG. 2, a shutter movement member (not shown) is provided, which receives the driving force (e.g., a rotational force) from a driving unit (e.g., a motor) and makes a translational movement, and the shutter member is coupled to the shutter movement member such that the shutter member moves linearly between the first position and the second position in a reciprocating manner.

According to some embodiments of the present invention, instead of the shutter member 250 that rotates centering around the shutter driving axis 240 shown in FIG. 2, a shutter movement member (not shown) is provided, which receives the driving force (e.g., a rotational force) from a driving unit (e.g., a motor) and an iris-like shutter member (not shown) is provided, which makes a rotational movement as an iris of a camera. The shutter member is coupled to the shutter movement member such that the shutter member moves between the first position and the second position in a reciprocating manner.

According to some embodiments of the present invention, instead of the shutter member 250 that rotates centering around the shutter driving axis 240 shown in FIG. 2, a shutter movement member (not shown) is provided, which receives the driving force (e.g., a rotational force) from a driving unit (e.g., a motor) and makes at least a rotational movement and a translational movement, and the shutter member is coupled to the shutter movement member such that at least a portion of the shutter member moves between the first position and the second position in a reciprocating manner.

Figure 3:
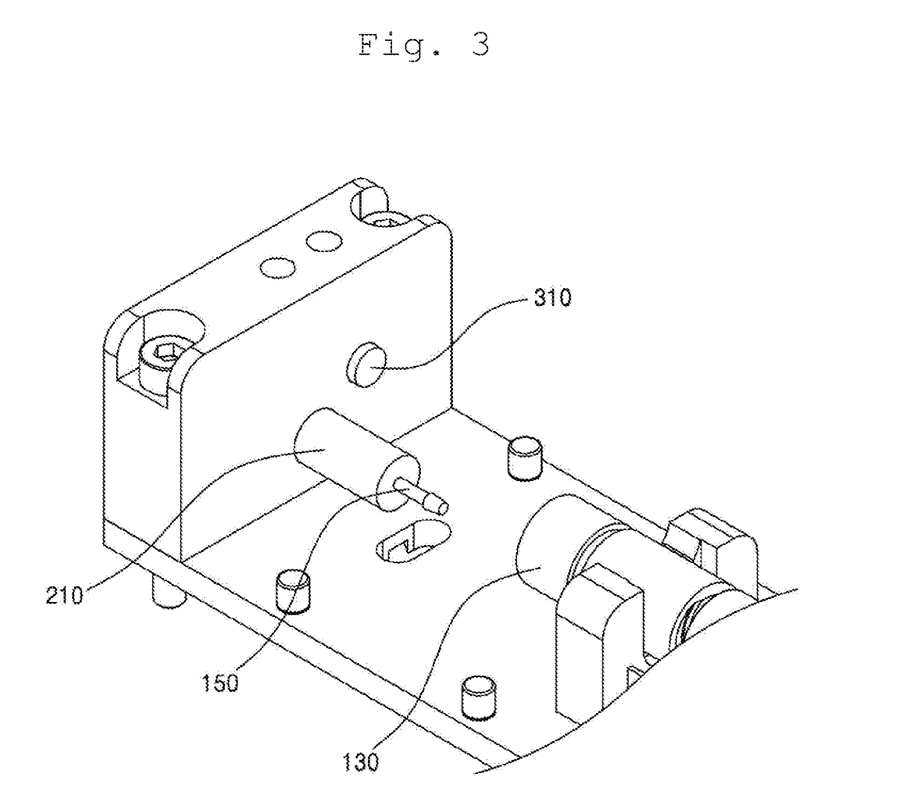
FIG. 3 is a perspective view of a motor (driving unit) and a discharge nozzle in the dispenser module of the 3D bio printer according to some embodiments of the present invention.

FIG. 3 is a perspective view of a motor unit (driving unit) 310 and the discharge nozzle 150 in the dispenser module 100 of the 3D bio printer according to some embodiments of the present invention. In FIG. 3, the tube 140 is omitted from drawing for the sake of convenience.

The motor unit (driving unit) 310 is disposed next to the discharge module 210, where a motor is installed with its rotation shaft coupled to the shutter driving axis 240 or functioning itself as the shutter driving axis 240. Therefore, when a voltage is applied to the motor unit 310 to rotate the shaft of the motor, the shutter driving axis 240 is rotated with the rotation of the shaft of the motor.

Various types of motors including a DC motor or a step motor can be used by being modified to meet the purpose of the present invention. The rotation direction can be switched with application of the appropriate voltage.

A power line cab be connected to the motor unit 310, the light-emitting elements 230a and 230b, and the discharge module 210 by connecting each power line to an external power source through a path (not shown) formed on the jacket of the dispenser module.

Figure 4:
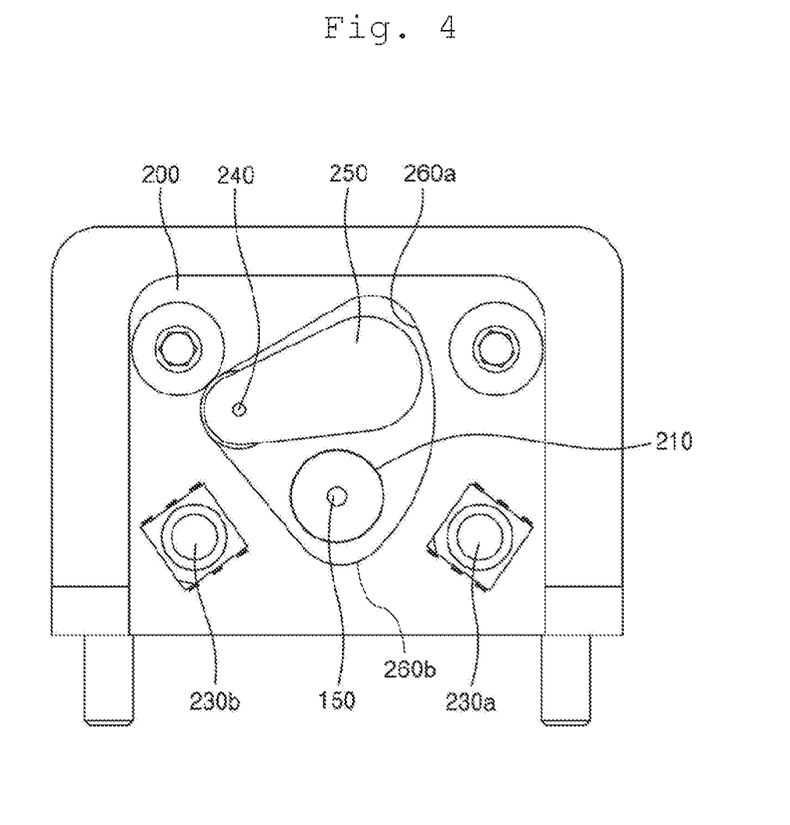
FIG. 4 is a plan view of the printhead including the shutter member for preventing photocuring of biomaterial in a 3D bio printer according to some embodiments of the present invention with a plurality of light sources emitting no light.
Figure 5:
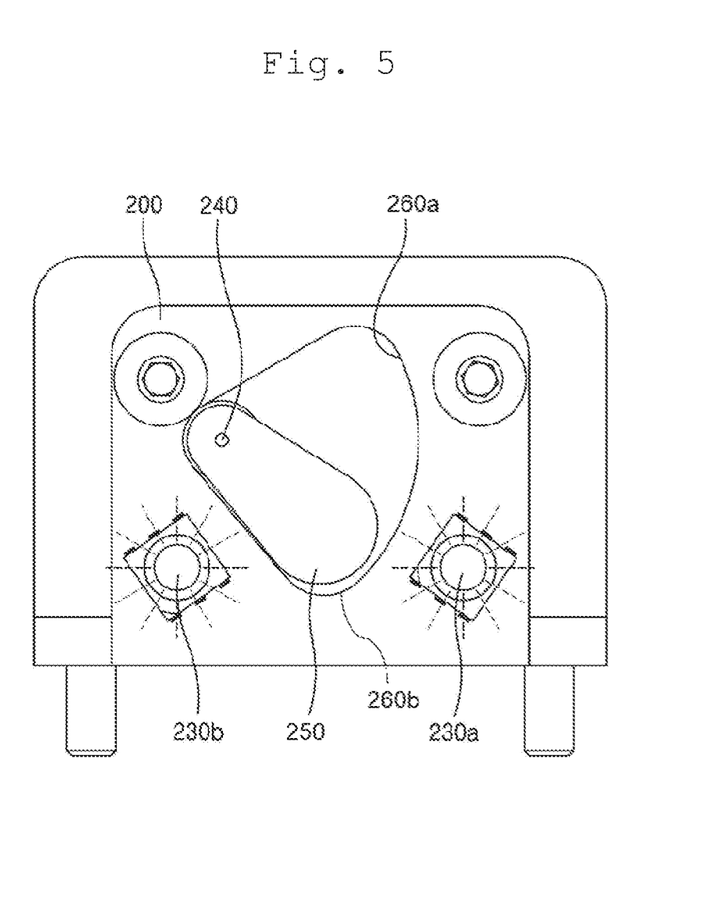
FIG. 5 is a plan view of the printhead including the shutter member for preventing photocuring of biomaterial in a 3D bio printer according to some embodiments of the present invention with the plurality of light sources emitting light.

FIG. 4 is a plan view of the printhead H including the shutter member 250 for preventing photocuring of biomaterial in a 3D bio printer according to some embodiments of the present invention with a plurality of light sources 230a and 230b emitting no light. FIG. 5 is a plan view of the printhead H including the shutter member for preventing photocuring of biomaterial in a 3D bio printer according to some embodiments of the present invention with the plurality of light sources emitting light. FIGS. 4 and 5 are plan views of the printhead H showing the operation of the shutter member 250 together with the operation of the plurality of light sources 230a and 230b for preventing photocuring of the biomaterial in the bio 3D printer according to some embodiments of the present invention.

In FIG. 4, the shutter member 250 is in an OPEN state, and the light-emitting elements 230a and 230b are turned off. The "OPEN state" means the discharge nozzle 150 is not covered (shielded). As the shutter member 250 is in the OPEN state so that the discharge nozzle 150 and the discharge module 210 are exposed, the biomaterial can be discharged from the discharge nozzle 150.

In FIG. 5, in order to photocure the biomaterial after being discharged, the light-emitting elements 230a and 230b are switched on and the shutter member 250 is rotated to a CLOSED state to cover the discharge nozzle 150 and the discharge module 210. The shutter member 250 is in the "CLOSED state", which is the opposite to the "OPEN state", and at this time, the discharge nozzle 150 and the discharge module 210 are all covered. After all, even when the light is emitted from the light-emitting elements 230a and 230b to photocure the biomaterial, the residual biomaterial on the discharge nozzle 150 and in the tube 140 and the biomaterial contained in the syringe 130 are covered from the light to avoid the photocuring. This can effectively prevent the cogging on the discharge path.

As described above, in the apparatus for preventing photocuring of biomaterial according to some embodiments of the present invention, the motor unit (driving unit) 310, the shutter member 250, the discharge nozzle 150, and the plurality of light sources 230a and 230b are integrated to form the printhead H.

As shown in FIG. 1, the printhead H includes the end plane 200. The shutter member 250 and the discharge nozzle 150 are disposed near the center of the end plane 200 and the plurality of light sources 230a and 230b are disposed on the end plane 200 sandwiching the shutter member 250 and the discharge nozzle 150.

In some embodiments of the present invention, the printhead H further includes the shutter driving axis 240 that receives the rotational force from the driving unit (motor unit 310) and rotates by the driving force. The shutter member 250 is coupled to the shutter driving axis 240 and moves (rotates) between the first position and the second position centering around the shutter driving axis 240 in a reciprocating manner with the rotation of the shutter driving axis 240.

In some embodiments of the present invention, printhead H further includes a shutter movement axis (not shown) that makes a transitional movement by receiving the rotational force from the driving unit (motor unit 310). The shutter member is coupled to the shutter movement axis and moves linearly between the first position and the second position in a reciprocating manner with the movement of the shutter movement axis.

In some embodiments of the present invention, shutter member is formed in an iris shape that rotates in an expanding and retracting manner like an iris of a camera by receiving the rotational force from the driving unit (motor unit 310). In this manner, at least a portion of the shutter member moves (rotates) between the first position and the second position in a reciprocating manner.

In some embodiments of the present invention, the end plane 200 includes the recessed portion 270 that is recessed by a predetermined depth. The discharge nozzle 150 and the shutter member 250 are disposed in the recessed portion 270, and the plurality of light sources 230*a* and 230*b* are disposed on the end plane 200 other than the recessed portion 270.

In some embodiments of the present invention, the end plane 200 includes the recessed portion 270 that is recessed by a predetermined depth. The discharge nozzle 150 and the shutter member 250 are disposed in the recessed portion 270, and the plurality of light sources 230*a* and 230*b* are disposed on the end plane 200 with the discharge nozzle 150 therebetween (i.e., sandwiching the discharge nozzle 150).

In some embodiments of the present invention, as shown in FIG. 2, the recessed portion 270 includes a first side wall (260*b*) near the plurality of the light sources 230*a* and 230*b* and the second side wall 260*a* facing the first side wall 260*b*. The discharge nozzle 150 is positioned in the recessed portion 270 near the first side wall 260*b*. The second side wall 260*a* facing the first side wall 260*b* in the recessed portion 270 limits the movement of the shutter member 250 not to exceed the first position, and the first side wall 260*b* limits the movement of the shutter member 250 not to exceed the second position.

In some embodiments of the present invention, a control unit (not shown) controls the plurality of light sources 230*a* and 230*b* to emit the light when the shutter member 250 is at the second position and not to emit the light when the shutter member 250 is at the first position. The control unit is a controller including, for example, a central processing unit (CPU) to control the discharge nozzle 150, the plurality of light sources 230*a* and 230*b*, and the driving unit (motor unit 310).

Figure 6:
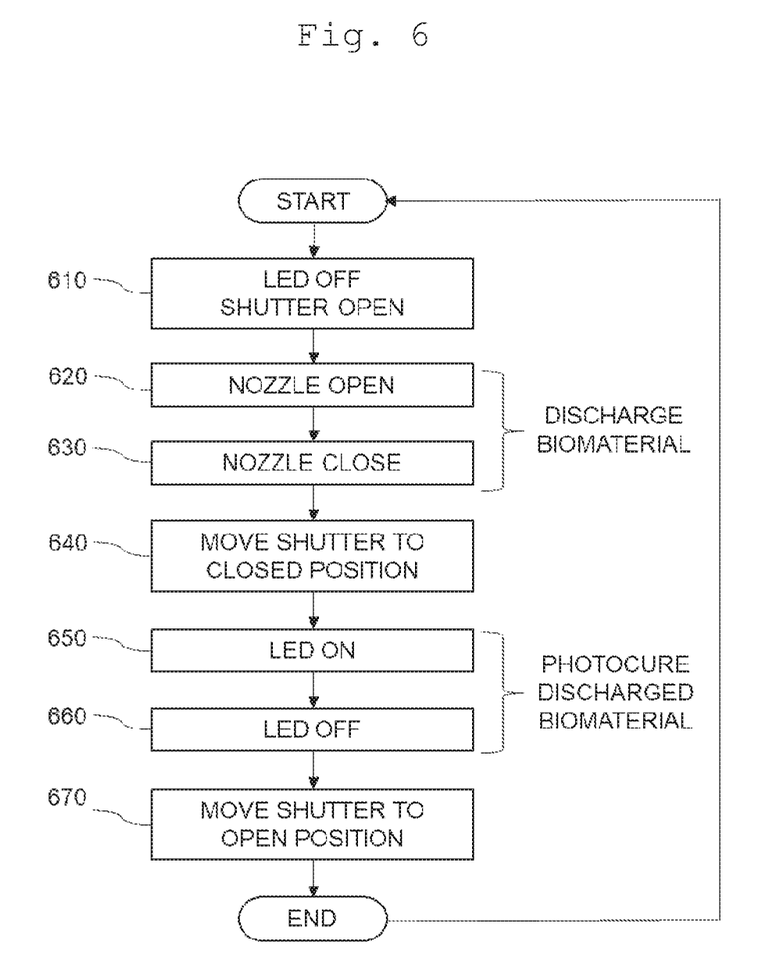
FIG. 6 is a flowchart for describing an operation of the shutter member for preventing photocuring of biomaterial in a 3D bio printer according to some embodiments of the present invention.

FIG. 6 is a flowchart for describing an operation of the shutter member for preventing photocuring of biomaterial in a 3D bio printer according to some embodiments of the present invention.

At Step 610, the light-emitting elements 230*a* and 230*b*, designated as "LED" are switched off, and the shutter member 250, designated as "SHUTTER" is at the open position.

As a pulse voltage is applied to the discharge module 210 to discharge the biomaterial, the discharge module 210 opens the discharge nozzle 150 (Step 620), a predetermined amount of the biomaterial is discharged, and the application of the pulse voltage is cut and the discharge nozzle 150 is closed (Step 630).

Opening and closing of the discharge nozzle 150 includes opening and closing of a physical device such as a mechanical switch or a piezo electric switch to allow or block the discharge of the biomaterial, as well as an air pressure controller to allow or block the discharge of the biomaterial from the discharge nozzle 150. Therefore, "opening" and "closing" of the discharge nozzle 150 is not limited to a physical switching of the nozzle, but includes similar schemes that can perform the similar function.

The discharged biomaterial falls downwards by gravity, and the shutter member 250 moves to the closed position to block the discharge nozzle 150 and the discharge module 210 (Step 640).

The movement of the shutter member 250 is limited to the closed position by an electrical control of the motor or a physical control such as the shutter movement limiter (second side wall) 260*a*.

Thereafter, the light-emitting elements 230*a* and 230*b* are switched on (Step 650), the discharged biomaterial is photocured by the light emitted from the light-emitting elements 230*a* and 230*b*, and then the light-emitting elements 230*a* and 230*b* are switched off (Step 660).

In order to discharge the biomaterial again, the shutter member 250 moves to the open position (Step 670), and one cycle of discharging the biomaterial ends (Step 680).

The above-described procedure can be performed with desired time periods and patterns by controlling the voltage applied to the discharge module 210, the light-emitting elements 230*a* and 230*b*, and the motor unit 310. Repeating the above-described procedure, the biomaterial can be discharged rapidly by the dispenser module 100, the discharged biomaterial can be securely photocured, and the residual biomaterial on the discharge nozzle 150 and the biomaterial contained in the dispenser module 100 can be protected from accidental photocuring.

Although the shutter mechanism of a dispenser module for a bio 3D printer is described in the specification, the above-described shutter mechanism can be applied in various forms, which is all within the scope of the present invention.

As described above, according to some embodiments of the present invention, it is possible to provide an apparatus for preventing photocuring of biomaterial in a discharge nozzle and a dispenser (or syringe) for a bio 3D printer.

Further, according to some embodiments of the present invention, it is possible to provide a bio 3D printer including an apparatus for preventing photocuring of biomaterial in a discharge nozzle and a dispenser (or syringe).

Moreover, according to some embodiments of the present invention, it is possible to prevent cogging of a discharge nozzle due to photocuring of biomaterial in a bio 3D printer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for preventing photocuring of biomaterial in a discharge nozzle and in a dispenser of a bio 3D printer that comprises the dispenser including the discharge nozzle configured to discharge the biomaterial and a plurality of light sources configured to emit light for photocuring the biomaterial when photocuring the biomaterial discharged from the discharge nozzle with the light emitted from the plurality of light sources, the apparatus comprising:

a driving unit configured to provide a driving force;

a shutter member configured to receive the driving force from the driving unit and to move between a first position not covering the discharge nozzle and a second position covering at least the discharge nozzle in a reciprocating manner; and a control unit configured to control the discharge nozzle, the plurality of light sources, and the driving unit, wherein the control unit is configured to control the driving unit in a manner that the shutter member takes the first position or the second position when no light is emitted from the plurality of light sources, to control the driving unit in a manner that the shutter member takes the first position when the biomaterial is discharged from the discharge nozzle, and to control the driving unit in a manner that the shutter member takes the second position when no biomaterial is discharged from the discharge module and the light is emitted from the plurality of light sources, the driving unit, the shutter member, the discharge nozzle, and the plurality of light sources constitute a printhead in an integrated manner, the printhead includes a first plane and a second plane opposite to the first plane, the driving unit is mounted on the first plane, the shutter member and a distal end of the discharge nozzle are mounted on the second plane, and the plurality of light sources are mounted on the second plane with the shutter member and the discharge nozzle therebetween.

2. The apparatus according to claim 1, further comprising a shutter driving axis coupling the driving unit and the shutter member and configured to receive the driving force from the driving unit and to make a movement, wherein at least a portion of the shutter member is moved between the first position and the second position with the movement of the shutter driving axis by the driving force received from the driving unit.

3. The apparatus according to claim 1, wherein the second plane includes a recessed portion, the discharge nozzle and the shutter member are positioned in the recessed portion, and the plurality of light sources are positioned on the second plane outside the recessed portion with the discharge nozzle and the shutter member therebetween.

4. The apparatus according to claim 1, wherein the second plane includes a recessed portion, the discharge nozzle and the shutter member are positioned in the recessed portion, and the plurality of light sources are positioned on the second plane with the shutter member and the discharge nozzle therebetween.

5. The apparatus according to claim 4, wherein the recessed portion includes a first side wall near the plurality of the light sources and a second side wall facing the first side wall, the discharge nozzle is positioned in the recessed portion near the first side wall, the second side wall is configured to limit a movement of the shutter member not to exceed the first position, and the first side wall is configured to limit the movement of the shutter member not to exceed the second position.

6. The apparatus according to claim 1, wherein the control unit is configured to control the plurality of light sources to emit the light when the shutter member is at the second position and not to emit the light when the shutter member is at the first position.

7. A printhead for a bio 3D printer that discharges biomaterial, the printhead comprising the apparatus according to claim 1.

8. A dispenser module for a bio 3D printer that discharges biomaterial, the dispenser module comprising the apparatus according to claim 1.

9. A bio 3D printer, comprising the apparatus according to claim 1.

* * * * *